United States Patent [19]

Berger

[11] 4,323,215
[45] Apr. 6, 1982

[54] HANG-UP FIXTURE
[76] Inventor: Sol J. Berger, 3186 Doolittle Dr., Northbrook, Ill. 60062
[21] Appl. No.: 128,542
[22] Filed: Mar. 10, 1980
[51] Int. Cl.³ .............................................. F16M 13/00
[52] U.S. Cl. ............................... 248/544; 248/205 A; 248/222.2; 248/228; 248/340
[58] Field of Search ............... 248/544, 205 A, 222.3, 248/222.2, 340, 317, 228, 72; 52/39

[56] References Cited
U.S. PATENT DOCUMENTS

| | | | |
|---|---|---|---|
| 1,838,935 | 12/1931 | Fixsen | 248/222.3 |
| 3,003,735 | 10/1961 | Havener | 248/228 |
| 3,018,080 | 1/1962 | Loudon | 248/228 |
| 3,666,225 | 5/1972 | Weinberger | 248/205 A |
| 3,809,799 | 5/1974 | Taylor | 248/205 A X |
| 3,952,985 | 4/1976 | Davenport | 248/317 |
| 4,025,019 | 5/1977 | Jacobsen et al. | 52/39 X |
| 4,065,090 | 12/1977 | Mauney | 248/317 X |
| 4,073,458 | 2/1978 | Sease | 52/39 X |
| 4,191,352 | 3/1980 | Schuplin | 248/317 |
| 4,221,355 | 9/1980 | Hoop | 248/340 |

FOREIGN PATENT DOCUMENTS 2252773  6/1975  France ................................. 248/228

Primary Examiner—Thomas F. Callaghan
Attorney, Agent, or Firm—Morris Spector

[57] ABSTRACT

The invention relates to a hang-up fixture for ceiling mounting adapted to have a twist-lock releasable connection with a ceiling element to provide a support for a hanging article such as a display sign, or banner in a store, or a hanging plant, or lamp, or the like.

6 Claims, 12 Drawing Figures

U.S. Patent
Apr. 6, 1982
4,323,215
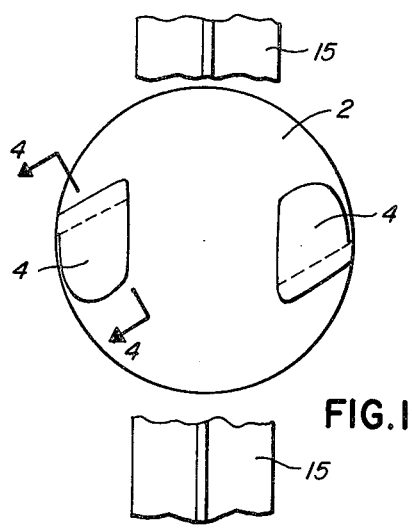
FIG.1
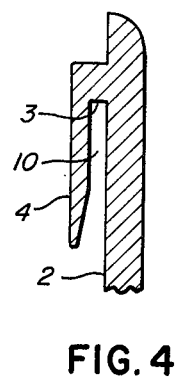
FIG.4
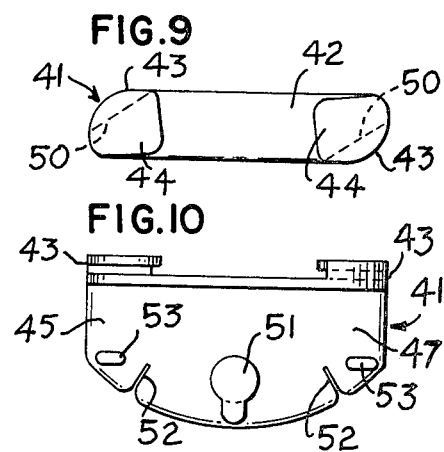
FIG.9
FIG.10
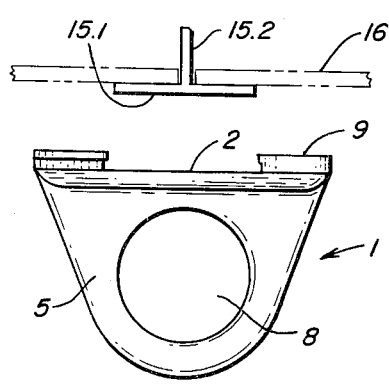
FIG.2 FIG.3
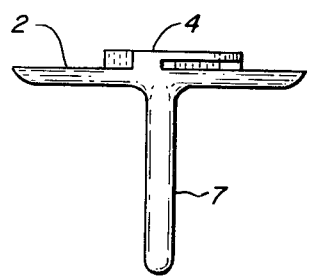
FIG.12
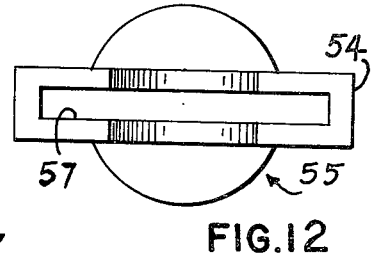
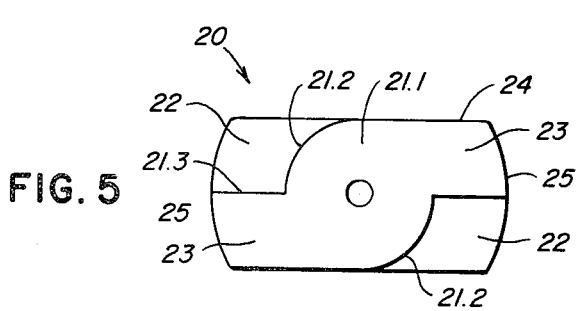
FIG.5
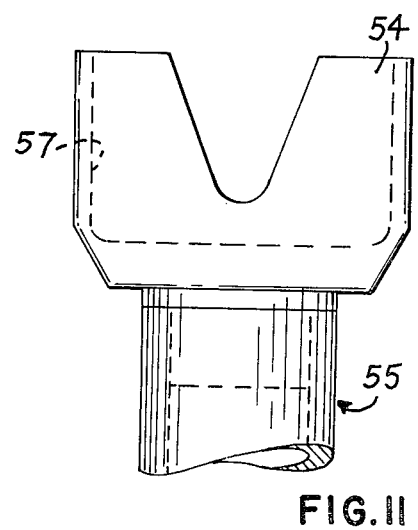
FIG.11
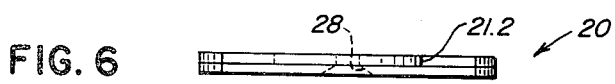
FIG.6
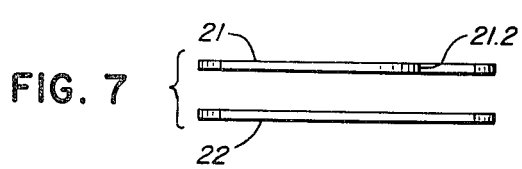
FIG.7
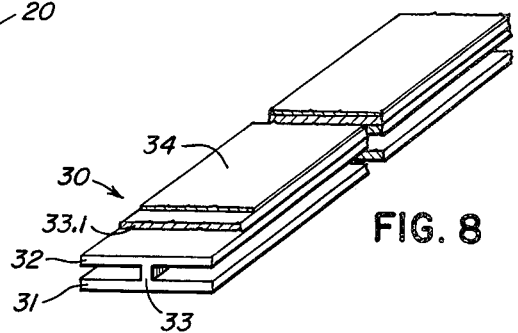
FIG.8

HANG-UP FIXTURE

BACKGROUND OF THE INVENTION

1. Field of the Invention

The invention relates primarily to sign displays in stores, or the like and particularly with respect to quick-connect-disconnect attachments for securing displays of this type to a ceiling.

2. Description of the Prior Art

Heretofore, it has been a general practice, particularly with respect to store displays, to mount placards, or signs such as advertising displays, by supporting then directly on the store shelves, or counter tops and when advertising banners were to be supported from the walls or ceiling of the store, fastenings of various types were secured directly to the walls, or ceiling and the banners were connected to such fastenings. However, the fastenings usually were of a semi-permanent nature and consequently when they were installed damage to the store structure resulted which had to be patched or restored to avoid unsightlyness.

SUMMARY OF THE INVENTION

This invention provides a ceiling hung suspension fixture for advertising signs, or the like, including so called swag lamps and hanging plants, or any element intended to be suspended from a ceiling. The invention includes a twist-lock element for attachment to an existing ceiling beam such as the flanged rails used in supporting a dropped ceiling which may be translucent and conceals plumbing fixtures, light fixtures, ducts and other elements encountered in buildings when such elements are normally maintained out of sight. The flanged rails for supporting the ceiling panels of such a dropped ceiling are usually of an inverted T-section so that oppositely extending horizontal flanges are disposed beneath adjacent ceiling panels in supporting relationship with the panels merely lying on the flanges and prevented from shifting by the upstanding web of the T-section.

The twist-lock element is adapted to engage and be supported from the T-section flanges and for this purpose the twist-lock device includes a flat seating surface on its upper face with spaced apart upward projections each having a laterally directed fin. These fins are adapted to engage over the T-section flanges when the element is twisted thus to attach the twist-lock element to the ceiling T-section. The twist-lock element includes a downwardly extending bottom flange forming an anchor point for attaching supports for signs, or placards, or such articles as may be suspended from a ceiling. When furnished as a ceiling support for store devices a suitable cord may be secured to the depending flange and wound thereabout as a convient means of attaching a sign or the like to a store ceiling.

OBJECTS OF THIS INVENTION

The primary purpose of this invention is to provide a ceiling hanging device that may be readily attached to a ceiling member and just as readily detached without damaging the ceiling in anyway.

The principal object of the invention is the provision of a hang-up device that may be secured to a ceiling element by a twist-lock action to provide a very simple attachment that is easily installed and removed.

An important object of the invention is to provide a hang-up device having a flat upper seating surface with a pair of spaced apart upward projections each having a laterally directed fin for engagement over respectively opposite flanges of a ceiling member and a downwardly extending flange on the hang-up device providing an anchor element.

Another object of the invention is the provision of a suspended type ceiling hang-up device in combination with a ceiling member having oppositely extending flanges to which the hang-up device may be secured by a slight twisting action.

A further object of the invention is to provide a ceiling hang-up device including an upwardly directed flat seating surface having a pair of spaced apart upward projections each of which has a laterally directed fin and a downwardly extending bottom flange on the underside of the hang-up device having an anchor element for a cord adapted to be wound around the bottom flange and secured in a slot provided in the flange.

DESCRIPTION OF THE DRAWINGS

The foregoing and other and more specific objects of the invention are attained by the structure and arrangement illustrated in the accompanying drawings wherein FIG. 1 is a top plan view of a ceiling hang-up device showing the pair of upward projections and respective laterally directed fins;

FIG. 2 is an exploded side view of the hang-up device disposed immediately beneath the ceiling in position to be raised against the underside of the ceiling panels at opposite sides of the supporting flanges;

FIG. 3 is an end elevational view of the hang-up device clearly showing the upward projection and laterally extending fin with the downwardly extending flange;

FIG. 4 is a sectional view through the hang-up device at the upward projection showing one of the laterally directed fins;

FIG. 5 is a top plan view of a ceiling adaptor for securement to a ceiling and having oppositely directed flanges for embracement by the opposite fins of a hang-up device;

FIG. 6 is a side elevational view of the adaptor of FIG. 5;

FIG. 7 is an exploded side elevational view of a form of the adaptor wherein two plates are secured together to form the adaptor;

FIG. 8 is a perspective view of another adaptor which is secured to the ceiling by self-adhering means;

FIG. 9 is a top plan view of a preferred form of hang-up device of narrower form but having the upward projections in spaced relation and laterally directed fins;

FIG. 10 is a side elevational view of the hang-up device of FIG. 9 showing the downwardly extending flange and the upward projections with laterally extending fins;

FIG. 11 is an elevational view of a mounting device for use with the hang-up fixture; and FIG. 12 is a top plan view of the upper mounting end of the device of FIG. 11;

DESCRIPTION OF FIRST EMBODIMENT

In the drawings as shown in FIGS. 1-4, a hang-up fixture 1 is illustrated as having an upwardly disposed flat surface 2 which is circular and comprises a seating surface adapted to engage a ceiling member such as an inverted T-section strip 15. The surface 2 of the hang-up fixture engages the underside of the horizontally extending flanges 15.1 of the T-section while the ceiling panels 16 are supported on the upper surfaces of the flanges at opposite sides of the T-section vertical web 15.2. The ceiling panels 16 merely rest on the flanges 15.1 so that they can readily be raised slightly to install the hang-up fixtures as will hereinafter appear.

The hang-up fixture 1 includes a pair of spaced apart upward projections 3 which are spaced sufficiently to receive the flanges 15.1 of the T-section between the projections so that the flat surface 2 bears against the underside of the flanges. The upward projections 3 each have a laterally extending fin 4 which it will be noted parallels the adjacent side edge of the flange 15.1 as best shown in FIG. 4 and when the hang-up fixture 1 is disposed in the relative position shown in FIG. 1 the upward projections 3 and fins 4 are disposed at the respective sides of the flanges 15.1 so that in applying the hang-up fixture to the T-section it may be said that the upward projections and fins straddle the horizontal flanges.

With the hang-up fixture in this relative position it is necessary merely to twist the fixture slightly whereupon the fins 4 will engage over the top surfaces of the respectively adjoining flanges 15.1 so that the fixture will thereby be effectively locked to the T-section with the respective flanges 15.1 engaged in the slot 10 formed by the fins. The fins 4 thus engage under the ceiling panels 16 lifting them slightly as the fins pass over the upper surface of the flanges 15.1 but since the ceiling panels are relatively light weight this involves no difficulty. The ceiling panels are of plastic material and usually translucent to provide for light transmission from lighting elements above the ceiling but concealing the lights from view beneath the ceiling.

The hang-up fixture 1 is provided with a downwardly extending flange 5 on its underside and this flange incorporates an eyelet, or opening 8, as best illustrated in FIG. 2. The opening 8 provides a convenient anchor point for securement of a cord, or the like, or possibly a hook of some kind to which advertising cards, or banners are attached. A cord for instance might be tied quite readily through the opening 8. The dependent flange affords a convenient place to grasp the hang-up fixture when applying the device to the T-section 15 and the flat sides 7 also enables the fixture to be held securely for placement relative to the flanges 15.1 and provides an effective means of twisting the fixture into locked relationship with the flanges.

DESCRIPTION OF PREFERRED EMBODIMENT

The hang-up fixture 41 illustrated in FIGS. 9 and 10 represents the preferable form of the invention reduced to its simplest structure and which makes for the most effective installation and ready attachment of articles to be hung therefrom. In this embodiment the hang-up fixture has a flat upper seating surface 42 but this area of the fixture is of narrower construction than the fixture of FIG. 1 so that the device takes a somewhat elongated shape that actually makes for better handling as well as a more attractive appearance. The length of the device is substantially similar to the diameter of the FIG. 1 form of the hang-up device.

The fixture 41 incorporates a pair of upward projections 43 that are spaced apart by a dimension such that the flanges 15.1 of the inverted T-section may be received therebetween with the upper flat surface 42 of the fixture bearing against the bottom surface of the flanges. Each upward projection 43 is provided with a laterally extending fin 44 that will overlie the adjacent flange 15.1 when the hang-up fixture is installed on the T-section. With the T-section bottom flanges disposed between the projections 43 it is necessary merely to twist the fixture 41 slightly to engage the fins 44 over the horizontal flanges and beneath the ceiling panels 16 to securely lock the hang-up fixture on the T-section. The flanges of the T-section fit into slots 50 formed between the fins and the surface 42 just as in the FIG. 1 form of the invention.

A downwardly extending flange 45 having the flat side surfaces 47, depends from the underside of the hang-up device as best illustrated in FIG. 10. This depending flange in this form of the invention performs several functions. It provides the most convenient place to grasp the hang-up fixture to apply the device to the T-section flanges 15.1, the flat sides 47 enabling the fixture to be held securely for proper placement relative to the horizontal flanges and affords the most effective means for twisting the fixture into locked position relative to the flanges.

The depending flange 45 also is equipped for receiving a suitable length of cord to be wound thereabout when not in use. Such a cord may be secured to an anchor member 51 that is formed integrally with the flange 45 more or less centrally thereof but adjacent to the bottom of the flange. A cord might be tied to this anchor point and wound about the flange and the free end of the cord caught in one or the other of the bottom slots 52 formed in the bottom edge of the flange thus to secure the cord against coming loose. Projection 53 on the face of the flange 45 prevent the cord wound about the flange from slipping downwardly and possibly come off the flange.

INSTALLATION EQUIPMENT

FIGS. 11 and 12 illustrate an installing device that might be utilized with either form of the hang-up fixture as represented by the device shown in FIG. 2 or that illustrated in FIG. 10. This device comprises essentially an extension pole 55 having a forked head 54 secured thereto at its upper end. The pole 55 may be hollow and the head 54 secured thereto by means of a bottom projection on the head which is entered into and secured in the top end of the hollow pole. The head 54 is adapted to receive either the flange 5 of the first form of the invention, or the flange 45 of the preferred form and to this end the forked head is provided with an upwardly facing slot 57 in which the flange 5, or the flange 45, is inserted when it is desired to install one or the other of the hang-up fixtures on the T-section flange 15.1. In this manner a person standing on the floor may install as many of the hang-up fixtures as may be required without the necessity of using a ladder to stand on in order to reach the ceiling.

CEILING FIXTURES

Where a store or other area may not be equipped with a drop ceiling of the type utilizing the inverted T-section strips 15 for supporting ceiling panels 16 mounted thereon it is possible to provide fixtures for attachment to a ceiling to which the hang-up fixtures can be secured in exactly the way they are mounted on the T-section strips. In FIGS. 5, 6 and 7 a fixture is shown that is adapted to be secured to a ceiling by a single screw which may be countersunk as indicated by the counterbored hole 28 as indicated in FIG. 6. The ceiling device 20 of these Figures is disclosed as being comprised of two flat plates, or strips 21 and 22 which are secured together face to face by cement, or the like.

The strips are of similar thickness and length and have end portions that are arcuate as at 25 between the parallel longitudinal side edges 24. The arcs thus indicated are of substantially the same radius as that of the circular fixture 1, illustrated in FIG. 1, whereby the hang-up devices will mate with the ceiling fixture and function just as in the attachment to the T-section strip 15. The strip 22 disposed at the bottom of the assembly is of full extent both longitudinally and across the full width thereof but the top strip 21 has two diagonally opposite corners cut away as at 21.2. These cut away portions are cut on an arc and extend approximately the longitudinal center line of this strip where the longitudinal edge 21.3 extends to the respectively adjacent arcuate end of the fixture. The end portions 23 of the top strip 21 extend fully to the opposite ends of the assembled strips even through this area is disposed only to one side of the center line 21.3 at the areas opposite to the diagonal corner recesses provided for receiving the fins 4 or 44.

The fixture 20 of course could be of integral molded construction if preferred whereby the recesses afforded by the cut-away areas 21.2 would provide pockets into which the fins 4 or 44 would be received. The laminated strips 21 and 22 however afford an economical way of achieving the same result. The bottom strip 22 at the diagonally opposite corners will be spaced from the ceiling by the thickness of the top strips 21 so that when the hang-up fixture is placed astraddle of the fixture 20 and twisted, the fins 4 or 44 will enter the spaces between the strip 22 and the ceiling at the diagonal corners and be secured just as described in reference to the T-section installation.

Another form of ceiling fixture for the attachment of the hang-up fixtures is illustrated in FIG. 8. In this form a ceiling element 30 of generally H-shape in section lying on its side, having lower and upper oppositely extending flanges 31 and 32 spaced apart and connected by a vertical web 33. On the top surface of the upper flange 32 a self-adhesive 33.1 is applied and this is covered by a releasable protective sheet 34. Thus when this fixture is to be applied to a ceiling the protective sheet 34 is removed and the exposed adhesive 33.1 is pressed against the ceiling in the desired location to stick the H-section fixture to the ceiling. In this manner the lower flange 31 is disposed to receive the hang-up devices 4 or 44 exactly as described in connection with the installation on the bottom flange of the T-section strip 15. The hang-up device will be positioned astraddle of the flange 31 and then twisted slightly to lock and secure the device on this bottom flange.

From the above description it is apparent that the word "ceiling" as herein used is intended to include not only the overhead inside lining of a room, but also, the under side of shelving or of a support on the underside of a cabinet from which it may be desired to suspend an object by means of a hang-up device, which device may be secured in place by using an adapter of FIGS. 5 or 8 if there is no ceiling member such as the strip 15.

What is claimed is:

1. A fixture adapted for installation in position to be suspended from the base of an overhead horizontal beam such as inverted "T" shaped beam at the ceiling of a store, said fixture having a top portion with an upper surface adapted to bear against the base of such beam and when the fixture is twisted about a vertical axis while it is being held against the base of the beam the fixture is brought into an installed position where it is secured to the beam and from which position the fixture is releasable by initially and solely twisting it in the reverse direction about the same axis, said fixture including a pair of projections extending upwardly from said upper surface at the periphery thereof, each of said projections having a fin extending therefrom over said upper surface, the free end of each fin at the portion thereof facing the top of said upper surface of the fixture being tapered outwardly away from said top surface of the fixture, said projections being spaced apart to embrace opposite edges of the base at locations spaced longitudinally of the beam when the fixture has been twisted to its installed position, and when the fixture is thus twisted to its installed position with its upper surface engaging the base of the beam the underside of each fin engages over the top surface of the base of such beam to effectively lock the fixture to the base of such beam, said fixture having means whereby it may be twisted to and from its installed position with respect to such beam, said twisting means comprising a flange integral with and projecting at right angles from the lower side of said top portion and extending substantially completely across said lower side of the top portion, and said twisting flange including means for facilitating hanging of an object from it.

2. Apparatus according to claim 1 wherein the last named means comprises means to which a suspension cord may be secured, and said flange also including a portion around which such secured cord may be wound when the fixture is not in use, and the flange has means for retaining the free end of such wound cord portion to keep the cord against unwinding from said flange.

3. Apparatus according to claim 2 wherein said flange also includes stop means for holding the wound cord from slipping off of the flange.

4. Apparatus according to claim 1 in combination with a tool for manipulating it into and out of its retained position with respect to said beam, said tool comprising a pole having a transversely slotted upper end upon which upper end the underside of said top portion of said fixture is adapted to rest with the flange of the fixture extending into the slot so that the walls of the slot restrain the fixture against sliding transversely off of the end of the pole and so that upon twisting of the pole in either direction about it longitudinal axis the walls of the slot transmit twisting torque to the flange of the fixture to twist the fixture in a corresponding direction.

5. Apparatus according to claim 4 wherein the flange means comprises means to which a suspension cord may be secured, and said flange also including a portion around which such secured cord may be wound when the fixture is not in use, and the flange has means for retaining the free end of such wound cord portion to keep the cord againt unwinding from said flange.

6. Apparatus according to claim 5 wherein said flange also includes stop means for holding the wound cord from slipping off of the flange.

* * * * *